United States Patent
Abraham

(10) Patent No.: US 7,248,380 B1
(45) Date of Patent: Jul. 24, 2007

(54) ADJUSTING SUBLINE ADDRESS FOR BURST TRANSFER TO/FROM COMPUTER MEMORY

(75) Inventor: Benjamin Abraham, San Jose, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 07/993,731

(22) Filed: Dec. 18, 1992

(51) Int. Cl.
*G06F 3/12* (2006.01)
*H04N 1/00* (2006.01)

(52) U.S. Cl. .................................. 358/1.15; 358/400
(58) Field of Classification Search ............... 358/1.15, 358/1.14, 1.13, 400
See application file for complete search history.

(56) References Cited

U.S. PATENT DOCUMENTS 5,131,083 A * 7/1992 Crawford et al. ........... 345/275
5,146,582 A * 9/1992 Begun ........................ 395/500
5,255,378 A * 10/1993 Crawford et al. ........... 395/325
5,325,499 A * 6/1994 Kummer et al. ............ 395/425

OTHER PUBLICATIONS

"1486 Microprocessor Hardware Reference Manual" Intel Corp, 1990, pp. 3-30 to 3-34.*

* cited by examiner

Primary Examiner—Douglas Q. Tran
(74) Attorney, Agent, or Firm—Mark T. Starr

(57) ABSTRACT

A burst-mode data transfer arrangement for transferring a "LINE" of data, arranged in a four-subline array, between a 32-bit-subline memory and a cache memory having 64 bits per sub-line, where, in every such transfer, four sublines must be transferred successively in one of four different sequences, depending on whether the initial access-subline is subline-#1, -#2, -#3 or -#4; this arrangement being adapted to derive the address of the third subline by:
  deriving an "access address" for the initial subline of the "LINE" to be transferred;
  converting the result to binary code form;
  inverting the fourth bit of this binary code form, and then
  converting this result to the desired code form, to constitute the address of the third subline (of the four to be transferred).

8 Claims, 7 Drawing Sheets

| CASE | 1st Subline | 3rd Subline |
|------|-------------|-------------|
| #1   | 0h          | 10h         |
| #2   | 8h          | 18h         |
| #3   | 10h         | 0h          |
| #4   | 18h         | 8h          |

FIG.6

ADJUSTING SUBLINE ADDRESS FOR BURST TRANSFER TO/FROM COMPUTER MEMORY

This case relates to data in computer memory, and more particularly, to techniques for transferring such in Burst mode.

BACKGROUND, FEATURES

Workers are, or soon will be, anticipating the use of improved computer processors (CPU chips) like the INTEL "Pentium" that present new capabilities to a computer system. For instance, one may now contemplate some aspects of upgrading a "486 system" board (wherein the INTEL 486 CPU chip is featured) by using it conjunctively with a "Pentium CPU" (by INTEL).

This will require proper interfacing, for instance, of the cache memory in the Pentium CPU to/from existing memory on a '486 system board. Such is functionally represented in FIG. 1 where the Pentium CPU 1 has its cache coupled to a 486 memory 3 via an appropriate interface 5. As workers know, from a cache view point, data bits in memory are arranged in imaginary "chunks" called "lines". And, transfers to/from cache are characteristically done in "Burst" mode with each "Burst" transferring a "line"; e.g. presently one 486 "Line-burst" transfer consists of a chain of four successive "sublines", each subline consisting of thirty-two (32) bits (or four bytes e.g. see FIG. 2 representation, with Pentium sublines being twice this size).

Any "line" on a 486-memory is accessed between 16-byte (10 hex) boundaries. By contrast, one Pentium "Line Burst" consists of four successive 64-bit sublines (see FIG. 2), each subline thus being double the size of a "486 subline". A Pentium subline resides in memory starting at 32-byte (20 h) boundary. Thus, a line Burst transfer moves four sublines in a certain order (not the order in memory); for such a transfer the CPU gives only the address of the "access-subline"; the system will transfer this access-subline first, followed by the three associated sublines in a certain prescribed order— varying according to the identity of the access-subline.

Thus, each one-line Burst Transfer from/to a Pentium cache to 486 memory should be done in two stages (because the number of bits transferred is doubled); and this presents the need to calculate the memory address where the second transfer-stage begins, that is, in terms of the FIG. 2 representation, an initial '486 Burst will begin at point A and end at point B, with the system, as presently constituted, automatically giving the beginning memory-address at A (i.e. where the first 486 subline is stored).

But, with a "double-burst", from the Pentium cache, a like "second stage" is called for, beginning at point B; thus, the address of the "third" Pentium subline must be derived (not automatically given) to initiate this second stage (at point B), to complete the Pentium burst. And, since the sublines in such a Burst are not simply in an incremental address-order, the system will need to "calculate the third subline address" for such a Pentium (or like 4×64 bit) Burst—something the interface (e.g. 5 in FIG. 1) should provide. To do this is a salient object of this case (e.g. to provide a simple method, or algorithm, for such a calculation).

To recapitulate, a '486 system board will normally transfer a line starting with the first subline at the accessed address given by the Pentium CPU; and, when the '486 system board completes its line burst transfer, the Pentium cache will have transferred only two sublines, or one-half its burst. To complete the Pentium line burst, the system board should perform a second like transfer, starting at the third Pentium subline address (or point B, FIG. 2). This address is not given by the CPU; so I propose a way of doing so, automatically, at the interface. That is, I here propose an algorithm to calculate the "third-subline-address" from the given "first-subline address".

Thus, it is an object hereof to address at least some of the foregoing needs and to provide one or several of the foregoing, and other, solutions.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements.

PREFERRED EMBODIMENT

Now, the Pentium CPU postulates four different Burst-orders, their value depending on that of the initial address. These orders are given in FIG. 3 as four "cases", each involving a different accessed, initial address 1A (see at *). FIG. 3 highlights the distance, in hex-bytes, from the 32-byte boundary (at left), in each (Pentium) memory subline (see four sublines, FIG. 2) given in FIG. 3, each heading its own column-site (e.g. S-1) for beginning of an 8-byte subline: i.e. "zero" (zero-hex or 0h) for column S-1, "8h" for column S-2, "10h" for column S-3, and "18h" for column S-4.

The four-case Burst transfers in FIG. 3 will be interpreted as follows [note: initial, or "access-address", marked *]:

Case #1: The "access-address" is at "0h" distance from boundary, so when a Pentium Burst begins with subline #1, it will automatically follow the "Case 1" sequence: beginning at site S-1, then proceeding to site S-2 (incrementing the S-1 address by 8 bytes), then to S-3 (incrementing the S-2 address by 8 bytes), then to S-4 (incrementing the S-3 address by 8 bytes. Here, the S-3 site is the "third" subline to be transferred.

On the other hand if the Burst begins at S-2 (Case 2, 8-bytes from boundary) it will proceed to S-1, (decrementing the S-2 address by 8-bytes) then to S-4, (incrementing the S-1 address by 24 bytes) then to S-3 (decrement the S-4 address by 8 bytes)—here, the "third subline" is at S-4.

If it begins at S-3 (Case 3) it will proceed to S-4, then to S-1, then to S-2—here the "third" subline is at S-2.

Lastly (case 4), if it begins at S-4, (18h from left-boundary) it will decrement the address by 8 bytes three times: to S-3, then to S-2, then to S-1—here, the "third" subline is in "S-2".

Figure 1:
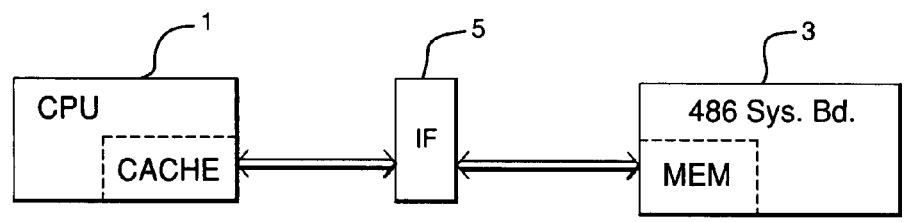
FIG. 1 is a simplified block diagram depicting computer memory elements between which data may be transferred.
Figure 2:
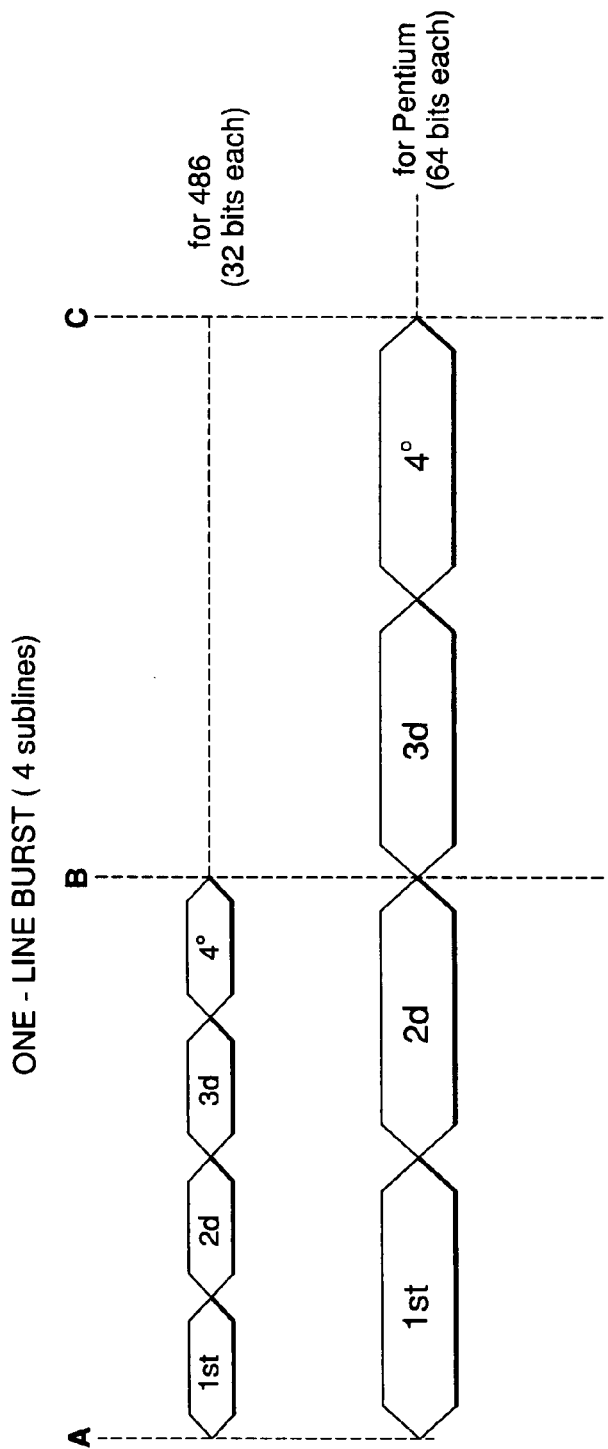
FIG. 2 is a representation of a typical "Pentium Line" and "486 Line" of data apt for Burst transfer.
Figure 3:
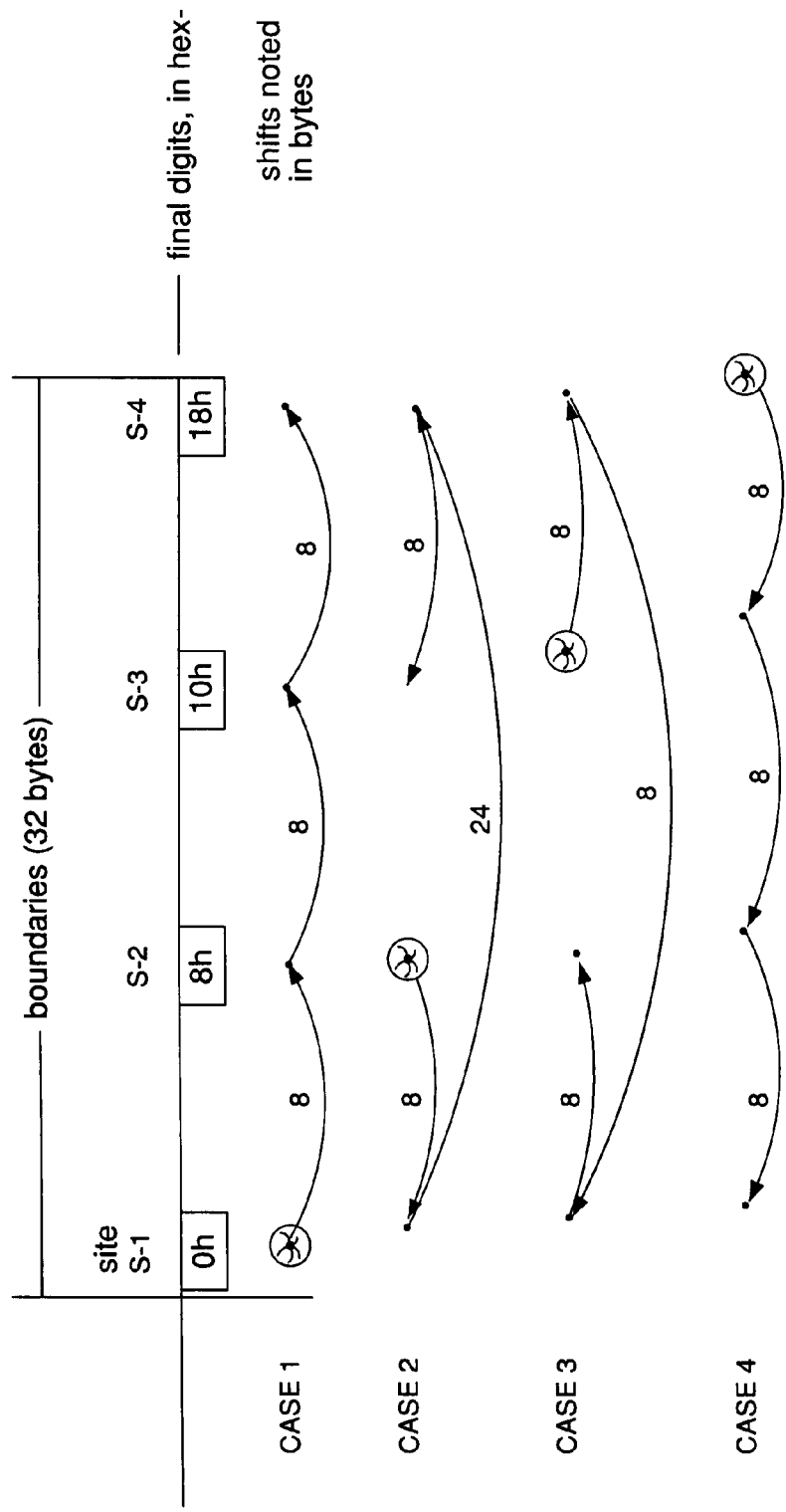
FIG. 3 represents four different orders of subline burst transfer, each initiated at a different point; with FIG. 4 giving representative hex addresses for each order.
Figure 4:
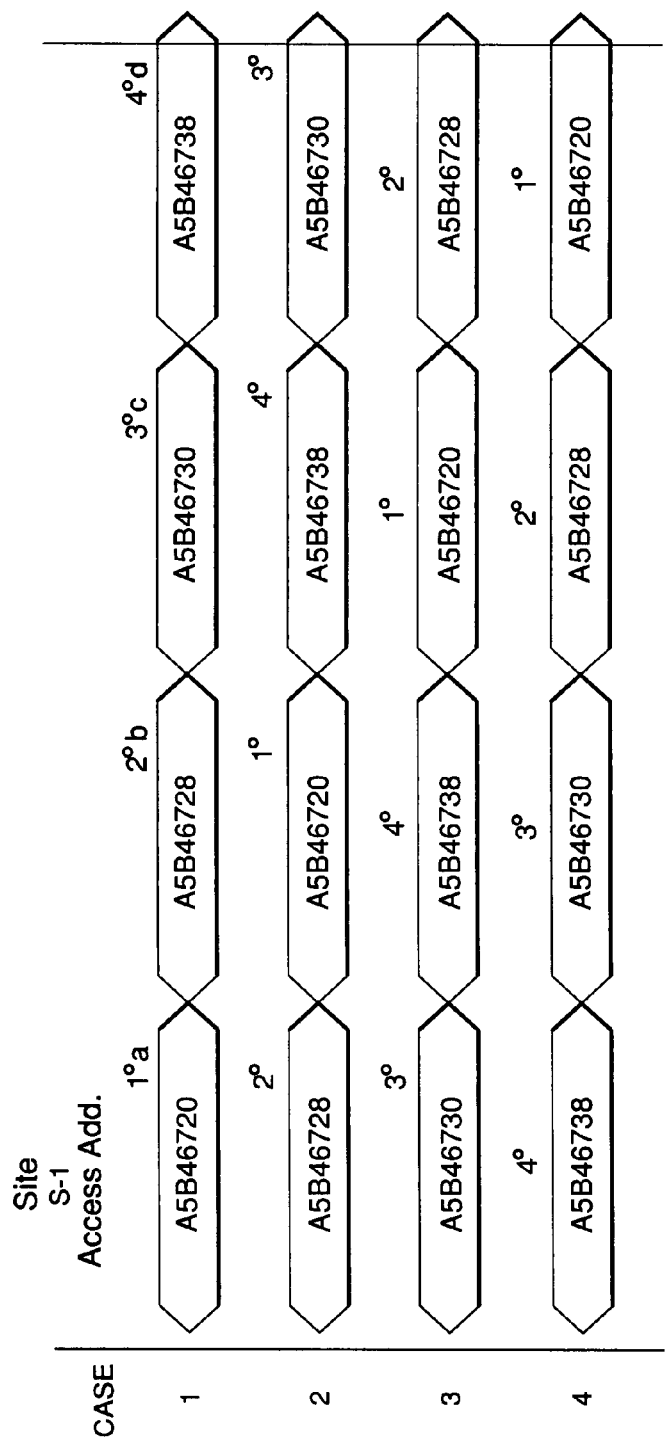

FIG. 4:

FIG. 4 will be understood as built upon the assumptions of FIGS. 2, 3, showing (exemplary) addresses, identified in hexadecimal code, of four sublines of a Pentium Burst for the four Cases of FIG. 3.

Thus, in Case #1 of FIG. 4, the first subline address is "0h" from left-boundary and the sequence of subline transfer gives the next subline address at a distance of "8h" (see FIG. 3, case 1, at S-2, or an 9 byte increment); the next at a distance "10h", or S-1 address incremented by 16 bytes and the last at a distance 18 h, or S-3 address incremented by 8 bytes—all as given in FIG. 3.

And, Case 2, in FIG. 4 starts at S-2, (distance 8h from boundary), then decrement the address by 8 bytes to S-1, then increments the s-1 address by 24 bytes to S-4 (or S-1 plus 18h), then decrements the s-4 address by 8 bytes to S-3 (or S-4 address minus 8h).

And, Case 3 in FIG. 4 starts at S-3 (16 bytes from boundary), increments the address by 8 bytes to S-4 (or S-3 address plus 8h), then decrements by 18h to S-1, then increments by 8h to S-2.

Last, Case 4, in FIG. 4, starts at S-4 (24 bytes from boundary); then decrements by 8, successively, to S-3 (S-4 address decremented by bytes), to S-2 (S-3 decremented by 8 bytes), and to S-1.

Simplified Conversion to yield Address of "Third" Pentium Subline.

Figure 5:
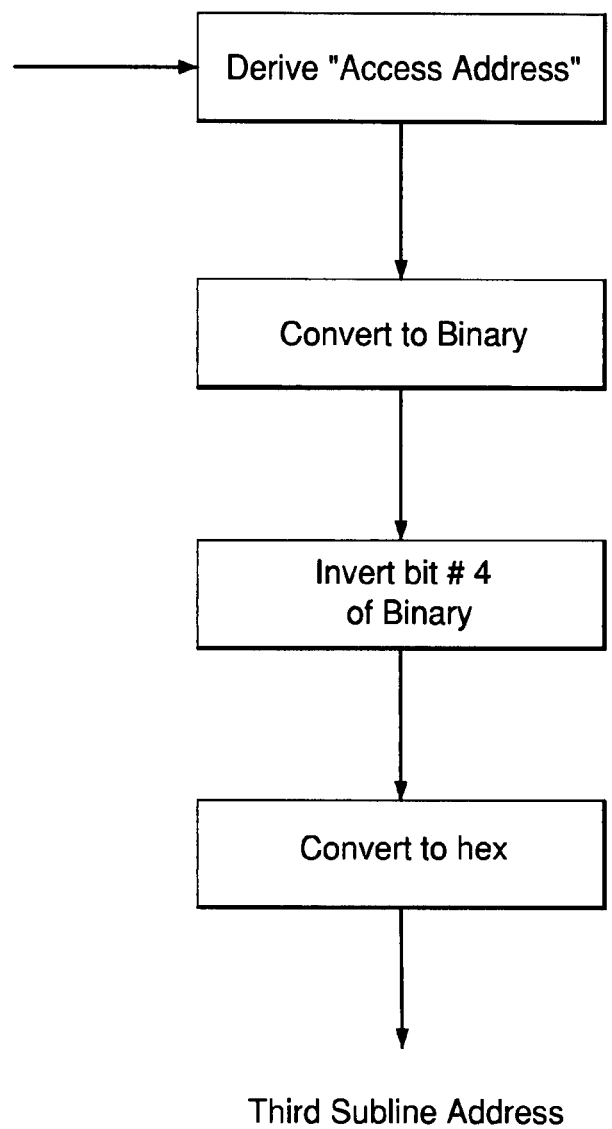
FIG. 5 is a flow chart depicting the preferred embodiment method; with the desired results being tabulated in FIG. 6 and FIG. 7 for these four orders.

In the foregoing I noticed that, in every case, one can—surprisingly—derive any "subline-3 address" via a simple conversion of a related subline-1 address; that is, by simply performing a binary inversion of the #4-address-bit of the subline-1 address; e.g. as indicated schematically in the flow chart of FIG. 5. Notice that address bits are counted "from zero up". The "least significant" address bit is address bit #0 (zero); while the "next-to-least significant" is address bit #1, and so on. This means that address bit #4 is the bit of "fourth highest significance" $(000X0000)_2$.

Figure 7:
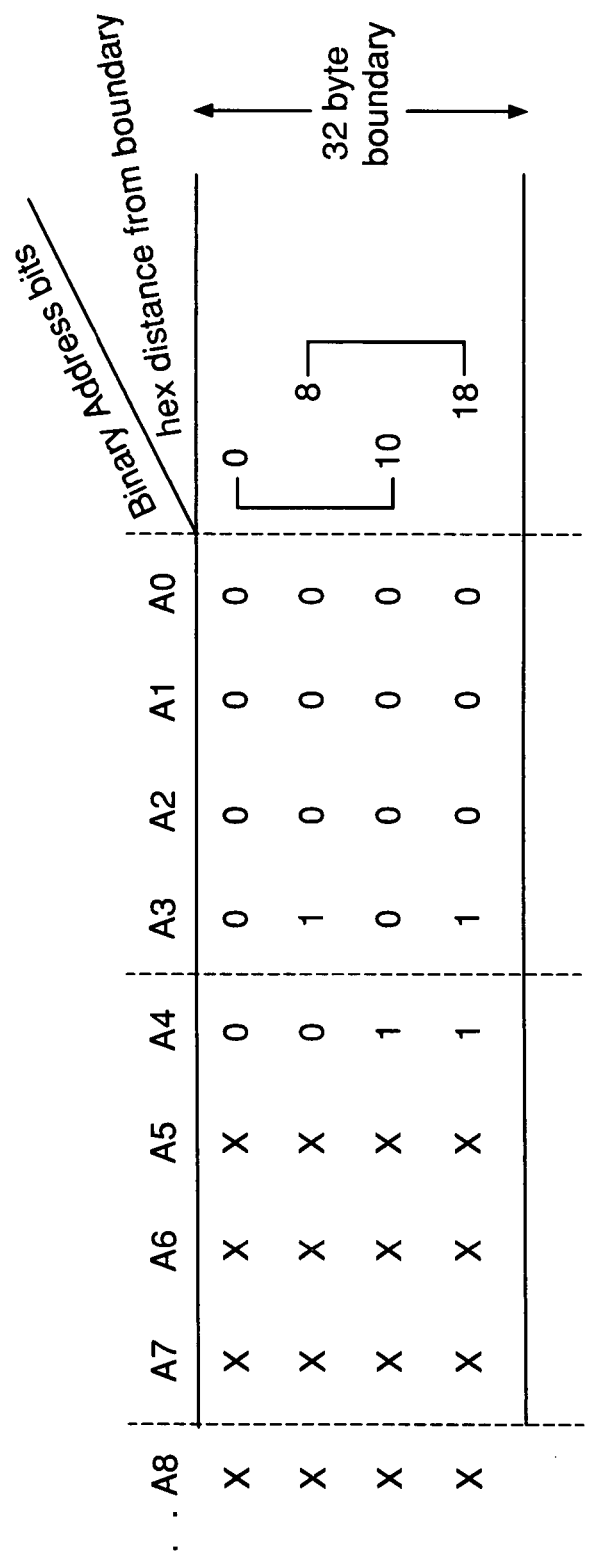

Proof of this is given in FIGS. 6 and 7. That is, from the Burst-order of the four cases, one can see the following relation between the first and third subline: [Note: when referring to general addresses, we use "distance" to means that distance, in bytes, of the address, from a "32-byte boundary"]

If first subline is at distance 0h, the third subline is at distance 10h;

If first subline is at distance 8h, the third subline is at distance 18h;

If first subline is at distance 10h, the third subline is at distance 0h; and

If first subline is at distance 18h, the third subline is at distance 8h.

This means: if the first subline (i.e. "accessed address") is at distance 0h or 8h from the boundary, then one adds 10h; while if it is at distance 10h or 18h, one subtracts 10h (summarized in FIG. 6).

Since every line resides in memory at a 32 byte boundary, then adding 10h to an address at 0h or 8h and subtracting 10h from an address at 10h or 18h gives the "third" subline address. But this can be done by simply inverting address-bit #4 (see FIG. 7 at A3).

Workers will recognize how surprising, yet how simple, this is; and what minimal logic-processing it requires to yield the address for any third subline.

It will be understood that the preferred embodiments described herein are only exemplary, and that the invention is capable of many modifications and variations in construction, arrangement and use without departing from the spirit of the invention.

Since modifications of the invention are possible, for example, the means and methods disclosed herein may also be applicable to other encoding/transfer modes and arrangements, as well as to other related data transfer systems.

The above examples of possible variations of the present invention are merely illustrative. Accordingly, the present invention is to be considered as including all possible modifications and variations coming within the scope of the invention as defined by the appended claims.

What is claimed is:

1. In the burst-mode transfer of one "LINE" of data arranged in a four-subline array, between a first '486-type, 32-bit-subline memory and a second memory having 64 bits per sub-line, where, in every such transfer, four sublines must be transferred successively in one of four different sequences, depending on whether the initial subline is subline-#1, -#2, -#3 or -#4, the steps for deriving the address of the third subline comprising:

placing the "access address" in binary form; and inverting the fourth bit thereof to thus constitute the address of the third subline in order, of the four sublines to be transferred.

2. A method for the transfer of one "LINE" of data between a first memory and a cache memory, each said LINE having N sublines, these to be transferred in order, this method comprising:

deriving an "access address" for the initial subline of the "LINE" to be transferred;

converting this access address from the original base to binary code form;

inverting the bit of fourth highest significance of this binary code form, and converting the result to the desired base form, to constitute the address of the subline which is third in order of transfer.

3. In a method for the transfer of one "LINE" of data, arranged in "four-sublines", between a first 32-bit-subline memory and a second cache memory having 64 bits per subline, where, in every such transfer, four sublines must be transferred successively in one of four different sequences, depending on whether the initial subline is subline-#1, -#2, -#3 or -#4, the steps for deriving the address of the third subline to be transferred, comprising:

deriving an "access address" for the initial subline of the "LINE" to be transferred;

converting the result from the original base to binary code form;

inverting the fourth bit of this binary code form, and converting the result to the desired base form, to constitute the address of the third subline of the four successive sublines to be transferred.

4. In the transfer of one "LINE" of data arranged in a four-subline array, between a first 32-bit-subline memory and a second cache memory having 64 bits per subline, where, in every such transfer, four sublines must be transferred successively in one of four different sequences, depending on whether the initial subline is subline-#1, -#2, -#3 or -#4, the steps for deriving the address of the third subline comprising:

placing the "access address" for the first subline to be transferred in binary form; and inverting the fourth most significant bit thereof to thus constitute the "access address" of the third subline to be transferred.

5. A burst-mode data transfer method for transferring a "LINE" of data, arranged in a four-subline array, between a 32-bit-subline memory and a cache memory having 64 bits per sub-line, where, in every such transfer, four sublines must be transferred successively in one of four different sequences, depending on whether the initial access-subline is subline-#1, -#2, #3 or -#4; this method being arranged to derive the address of the third subline of the four to be transferred, and comprising:

deriving an "access address" for the initial subline of the "LINE" to be transferred;
converting the result to binary code form;
inverting the fourth bit of this binary code form, and then converting this result to the desired code form, to constitute the address of the said third subline.

6. In a burst-mode data transfer arrangement for the burst-mode transfer of one "LINE" of data, arranged in a four-subline array, between a first type, 32-bit-subline memory and a second cache memory having 64 bits per subline, where, in every such transfer, four sublines must be transferred successively in one of four different sequences, depending on whether the initial access-subline is subline #1, #2, #3 or #4, this transfer arrangement being adapted to derive the address of the third subline, the method comprising:

deriving the "access address" of the first subline to be transferred; placing this in binary form; and
inverting the fourth-bit thereof to thus yield the address of the third subline.

7. In a data transfer arrangement for the burst-mode transfer of one "LINE" of data, arranged in a four-subline array, between a first 32-bit-subline memory and a second cache memory having 64 bits per subline, where, in every such transfer, four sublines must be transferred successively in one of four different sequences, depending on whether the first access-subline is subline #1, #2, #3, #4, this transfer arrangement being apt for deriving the address of the third subline, the method comprising:

deriving the "access address" of the first subline to be transferred; placing "access address" in binary form; and inverting the fourth most significant bit thereof to thereby yield the access address of the third subline to be transferred.

8. The method claim 7, including providing means for said deriving and said inverting in interface means coupled between said first and second memories.

* * * * *